Patented June 23, 1942

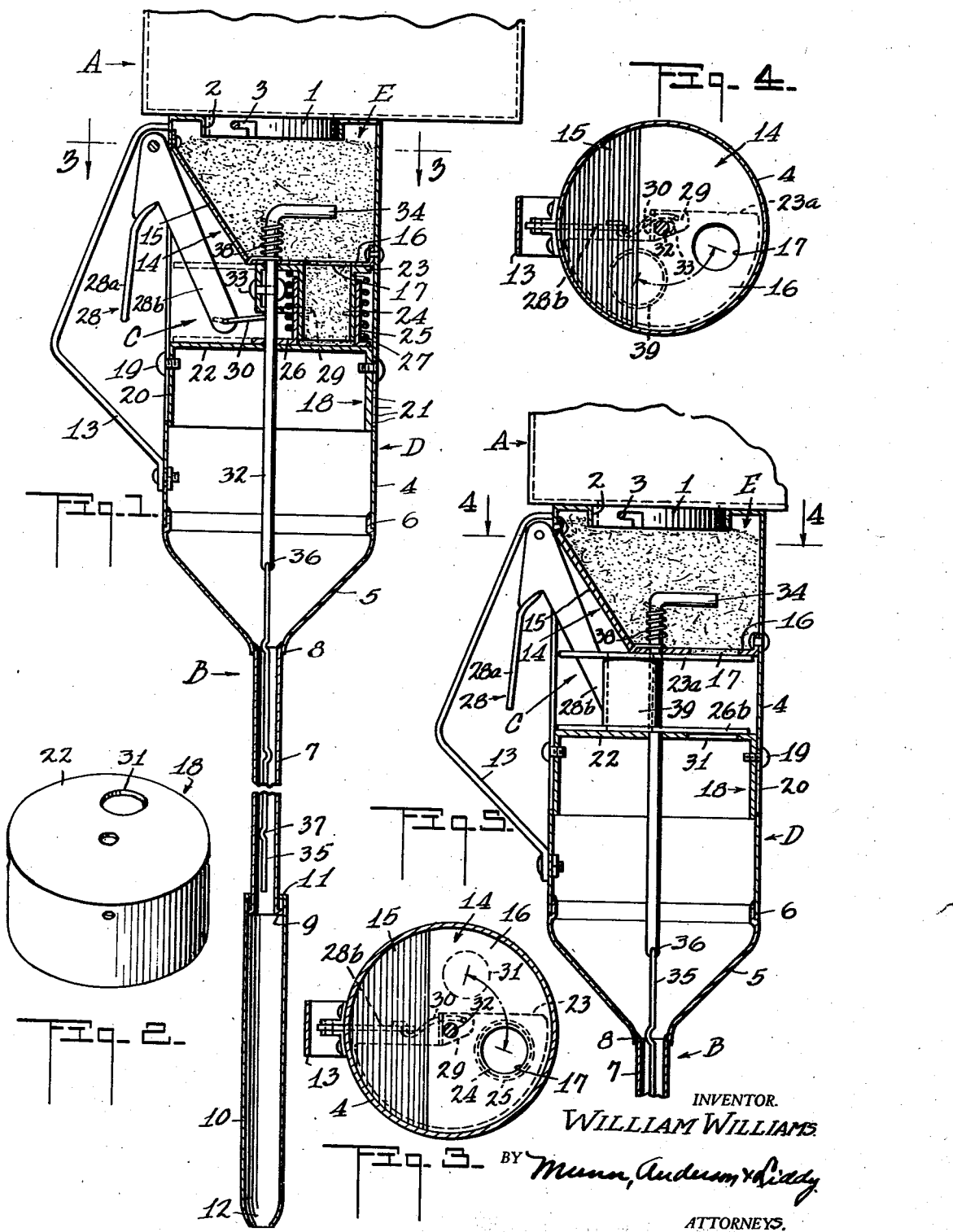

2,287,216

UNITED STATES PATENT OFFICE 2,287,216

DISPENSER

William Williams, Monterey, Calif.

Application March 4, 1940, Serial No. 322,132

6 Claims. (Cl. 221—119)

My invention relates to improvements in dispensers, and it consists of the combinations, constructions and arrangements hereinafter described and claimed.

An object of my invention is to provide a dispenser, which among other uses, is particularly well adapted for use by a gardener for placing fertilizer, insecticides, or other material around plants, shrubbery, or the like. The material may be dispensed in predetermined quantities, if desired, in order to meet with the requirements and to insure uniform distribution thereof.

Various commercial fertilizers and insecticides must be kept out of contact with the plants, or the like, when being applied thereto. It is a further object of my invention to provide a dispenser for effecting such placing of the material without injuring the plants.

These commercial fertilizers and insecticides vary in strength and the amounts required for different plants will also change. Therefore, I propose to provide a dispenser that can be adjusted to meet with the requirements.

A still further object of my invention is to provide a dispenser which will allow the material to be dispensed therefrom with facility and ease, and under direct control of the gardener. The dispenser is preferably provided with valve means for controlling the flow material to the plants, and I propose to arrange the actuating means for the valve within easy reach of the gardener, and preferably under control of the same hand of the gardener in which the device is being carried. The discharge spout of the dispenser may be made sufficiently long to allow the material to be placed around the plants without necessitating the gardener stooping over.

It is still further proposed to provide agitating means in connection with my dispensers that will insure the easy flow of material to the plants, and which will break up any cakes that tend to form due to absorption of moisture.

Other objects and advantages will appear as the specification continues, and the novel features of my invention will be set forth in the claims hereto appended.

For a better understanding of my invention, reference should be had to the accompanying drawing, forming part of this application, in which:

Figure 1 is a vertical sectional view taken through one form of my dispenser, parts being shown in elevation;

Figure 2 is a perspective view of an inverted cup which I employ;

Figure 3 is a horizontal transverse sectional view taken along the line 3—3 of Figure 1;

Figure 4 is a sectional view through a modified form of my dispenser and taken along the line 4—4 of Figure 5; and Figure 5 is a fragmentary vertical section of the modified form.

While I have shown only two forms of my dispensers, it should be understood that various changes, or modifications, may be made within the scope of the claims hereto appended without departing from the spirit of the invention.

Referring now to Figures 1 to 3, inclusive, it will be noted that I provide a container, indicated generally at A, having a discharge spout B extending therefrom, and valve means C in the upper enlarged portion D for controlling the flow of material E through the discharge spout.

The container A has been illustrated as having a short spout 1 formed at the bottom thereof, which may be introduced into an opening 2, the latter being fashioned at the top of the enlarged portion D of the discharge spout B. Any desirable and suitable means may be employed for securing the short spout 1 in the opening 2, and for this purpose I have shown a pin and bayonet slot connection 3.

The upper enlarged portion D of the discharge spout B includes a cylindrical section 4 having a conical part 5 secured thereto, as at 6. A tube 7 is fastened at 8 to the conical part 5, and the lower end of the tube 7 has an outwardly-extending annular flange 9 formed thereon. In Figure 1 I have illustrated another tube 10, which telescopes over the tube 7, and an inwardly-extending circular flange 11 is provided at the top of the tube 10. It will be apparent from this construction that the tube 10 may be extended relative to the tube 7 in order to place the final discharge opening 12 of the dispenser near the plants, shrubbery, or the like, while permitting the gardener to grasp the handle 13, the latter being fastened to the enlarged portion D.

It will also be noted that the tube 10 may be moved upwardly relative to the tube 7 in order to shorten the length of the entire dispenser for convenient storage or packing of the dispenser. The collapsed discharge spout will allow the dispenser to be packed in a smaller carton than would be required for a non-collapsible discharge spout.

A partition 14 extends across the upper enlarged section D and has an inclined wall portion 15 and a horizontal base 16. The material E, which may be fertilizer, insecticide, or the like, freely flows from the container A and keeps the space above the partition 14 filled at all times. The partition 14 has an opening fashioned therein, as at 17, and this opening is arranged in the horizontal base 16.

An inverted cup 18 is slidably telescoped into the cylindrical part 4 and screws 19 are used for holding the cup in adjusted position. Slots 20 are provided in the cylindrical part 4 for accommodating the screws 19. The dispenser shown in Figures 1 to 3, inclusive, is designed to dispense a predetermined quantity of material during each operation, and this amount may be varied. A scale 21 (see Figure 1) coacts with one of the screws 19 for indicating the amount of material being dispensed in a single operation.

The valve means C is interposed between the partition 14 and the upper wall 22 of the inverted cup 18. An upper shutter plate 23 (see Figures 1 and 3) bears against the underneath surface of the horizontal base 16. This shutter plate has a downwardly extending tube 24 that telescopes into an upwardly-projecting tube 25 rising from a second shutter plate 26. These two shutter plates are identical in outline and are arranged parallel with respect to each other. The shutter plate 26 rests on the upper wall 22 of the inverted cup 18. A spring 27 is interposed between these two shutter plates and urges the latter apart. The spring 27 has been shown in Figure 1 as encircling the telescoping tubes 24 and 25.

The space within the tubes 24 and 25 determines the amount of material E to be dispensed during each operation, and by merely raising or lowering the inverted cup 18 this amount may be changed. The scale 21 is suitably calibrated for indicating the amount to be dispensed.

Referring now to the mechanism for operating the shutters 23 and 26, it will be noted that I make use of a bell-crank lever 28. One arm 28a is positioned to be grasped by the gardener, while the other arm 28b projects through the upper part of one of the slots 20 into a position below the partition 14. The upper shutter plate 23 has a tongue 29 formed integral therewith, and this tongue is connected to the arm 28b by means of a wire-like link 30.

The two telescoping tubes 24 and 25 normally register with the opening 17 in the partition 14 and these tubes are filled with the material E, the latter being prevented from further downward movement by the upper wall 22 of the inverted cup 18, as will be apparent by reference to Figure 1. In operating the dispenser, the gardener grasps the handle 13 and pulls on the arm 28a. This will swing the shutter plates 23 and 26 counterclockwise in Figure 3 until the tubes 24 and 25 move out of registry with the opening 17 and into registry with an opening 31 formed in the wall 22 of the inverted cup 18. The contents within the two tubes 24 and 25 fall through the opening 31 and gravitate downwardly through the telescoping tubes 7 and 10. Further flow of material through the opening 17 is prevented by the upper shutter 23 until the tubes 24 and 25 are moved back again into registry with the opening 17.

A rod 32 forms the pivotal point on which the two shutter plates are swingable. A rivet or the like 33 secures the upper shutter plate to the rod 32 and the latter is moved with the shutters accordingly during their swinging movement. The top of the rod 32 is turned over at 34 in order to serve as an agitator in the section of the enlarged portion D above the partition 14. This turned end of the rod 32 preferably extends over the opening 17 and urges the material E towards the latter.

A wire 35 is pivoted to the lower end of the rod 32, as at 36, and this wire extends downwardly into the tube 7 so as to act as an agitator therein. The wire is bent at intervals at 37 to act upon the material and prevent the latter from lodging in the discharge tube.

The operation of the first form of my dispenser will be briefly set forth. The container A is secured to the upper end of the discharge tube or spout B in the manner hereinbefore mentioned. The tube 10 is slipped downwardly relative to the tube 7 until the final discharge opening 12 can be placed near the plants, shrubbery or the like without requiring the gardener to stoop over. The bell-crank lever 28 is actuated by the same hand of the gardener that is grasping the handle 13 and this will cause the shutter plates 23 and 26 to swing counterclockwise in Figure 3 until the tubes 24 and 25 register with the opening 31 in the inverted cup 18. The shutters cut off further flow of material past the partition 14. The contents of the two telescoping tubes 24 and 25 pass through the opening 31 and gravitate downwardly and finally out of the opening 12.

In Figure 1 I show a spring 38 for returning the shutters to normal position when the gardener releases his grip on the bell-crank lever 28; that is, the tubes 24 and 25 again register with the opening 17.

I wish to particularly point out that the valve means in my dispenser is arranged in the upper enlarged section D of the discharge spout B. This permits the material to flow gently downwardly after passing the shutters. If the valve means were disposed in the lower restricted part of the spout and the latter were kept filled with the material, the latter would tend to clog the spout and form cakes. Some material that I intend to use in my dispenser has a sticky substance therein.

It should also be noted that my shutters act like knives, which shear through the material when the shutters are moved over the horizontal base 16 of the partition 14. Poppet valves cannot be used when the material is sticky. I take advantage of using the enlarged portion of the discharge spout for the accommodation of the valve means C and allow the material to enter the lower restricted part of the spout only during actual dispensing of the material.

The first form of my invention may be regarded as a dispenser which is adapted to discharge material in predetermined measured quantities, while the form shown in Figures 4 and 5 is intended to be used where it is desired to dispense material without measuring the latter. In other words, the material will flow from the dispenser as long as the valve means in the second form are kept open.

The same general arrangement of parts is shown in Figures 4 and 5 as in the form of my invention just described in detail. Like numerals will therefore be applied to corresponding parts. In this modified form (Figures 4 and 5), the inverted cup 18 is turned until its opening 31 is in alignment with the opening 17 in the partition 14. A shutter mechanism is interposed between the inverted cup 18 and the horizontal base 16, which is the only further change from the first form.

This shutter mechanism consists of an upper plate 23a and a lower plate 26b, both plates being identical in outline and having a tube 39 interconnecting the two plates. When the shutter mechanism is operated to bring the tube 39 into registry with the aligned openings 17 and 31, the material above the partition 14 will flow continuously. When the gardener releases his grip of the bell-crank lever 28, the spring 38 will swing the shutter plates 23a and 26b into positions to close off further flow of material. The bell-crank lever 28 is connected to the shutter mechanism in Figures 4 and 5 by the same means as shown in Figures 1 to 3, inclusive.

I claim:

1. A dispenser comprising a container for material, a discharge spout extending therefrom, the spout having an enlarged upper portion and a restricted lower portion, the latter being disposed at the outlet end of the spout, valve means in the upper enlarged portion for controlling flow of the material from the container to the discharge end of the spout, and agitating means in the restricted portion of the spout active on the material passing therethrough and being operated by the valve means when the material is being valved into said restricted spout portion to prevent clogging of the material therein.

2. A dispenser comprising a conduit having a partition forming a hopper therewith for material, the partition having an outlet opening therein, a cup-like member enclosed in and mounted across the conduit and having an outlet opening therein, a pair of shutter plates mounted for swinging over the surfaces of the partition and the bottom of the cup, respectively, tubes secured to and extending from the plates and telescoping with each other to provide a passageway for material from one shutter plate to the other, the tubes being slidable with respect to each other whereby the capacity of the tubes may be varied, means adjustable from the exterior of the conduit for positioning the cup-like member to maintain its bottom wall in contact with the shutter plate that rides thereover, the shutter plates and their tubes being movable into positions whereby the latter may receive material from the partition opening and discharge the material through the cup opening, yielding means encircling the tubes for urging the shutter plates respectively against the partition and the bottom of the cup at all times regardless of the adjustment of the cup, and means for actuating the shutter plates and their tubes.

3. In a dispenser, a conduit having an enlarged upper portion and a lower restricted lower portion, a partition in the upper enlarged portion forming a hopper therewith for receiving material to be dispensed, the partition having an outlet opening, a shutter valve swingable over the surface of the partition for controlling the flow of material through the opening, a rod passing through the partition and valve and serving as a pivot for the latter, the rod being movable with the valve, an agitator secured to the lower end of the rod and extending downwardly into the restricted portion of the spout to prevent clogging of material therein, and means for actuating the valve.

4. In a dispenser, a conduit having a partition forming a hopper therewith for receiving material to be dispensed, the partition having an outlet opening and an inclined wall leading toward the opening, the inclined wall and the adjacent portion of the conduit forming a space beneath the inclined wall for receiving an inclined arm of a bell-crank lever, a shutter valve swingable over the surface of the partition for controlling the flow of material through the partition opening, a bell-crank lever pivoted to the conduit with one arm of the lever extending through said space and the other arm of the lever disposed exteriorly of the conduit for manual operation, and means connecting the inner arm of the lever to the shutter valve for operating the latter.

5. In a dispenser, a conduit having a partition forming a hopper therewith for receiving material to be dispensed, the partition having an outlet opening and an inclined wall leading toward the opening, the inclined wall and the adjacent portion of the conduit forming a space beneath the inclined wall for receiving an inclined arm of a bell-crank lever, a shutter valve swingable over the surface of the partition for controlling the flow of material through the partition opening, a bell-crank lever pivoted to the conduit with one arm of the lever extending through said space and the other arm of the lever disposed exteriorly of the conduit for manual operation, means connecting the inner arm of the lever to the shutter valve for operating the latter, and a handle secured to the conduit and overlying the outer arm of the lever, the handle having a hand-grasping portion extending downwardly and outwardly relative to the conduit at such an angle that when said handle portion is lifted in an operator's hand the opening in the partition will be presented on the lower side of the hopper and thus facilitate flow of material from the hopper through the partition opening.

6. In a dispenser, a hopper for holding material, a conduit for receiving material from the hopper, a valve for controlling the flow of material from the hopper into the conduit and including a rockable shaft for operating the valve, said shaft having one end extending into the hopper and being bent to constitute an agitator for loosening the material in the hopper each time the valve is actuated, said shaft also having its other end extending into the conduit and provided with material-agitating portions for loosening the material in the conduit each time the valve is actuated, and means for rocking the shaft for actuating the valve and agitating portions.

WILLIAM WILLIAMS.